(12) United States Patent
Zhu et al.

(10) Patent No.: US 11,617,985 B2
(45) Date of Patent: Apr. 4, 2023

(54) FLUE GAS PURIFICATION AND WASTE HEAT UTILIZATION SYSTEM AND METHOD

(71) Applicant: INSTITUTE OF PROCESS ENGINEERING, CHINESE ACADEMY OF SCIENCES, Beijing (CN)

(72) Inventors: Tingyu Zhu, Beijing (CN); Yang Yang, Beijing (CN); Wenqing Xu, Beijing (CN)

(73) Assignee: INSTITUTE OF PROCESS ENGINEERING, CHINESE ACADEMY OF SCIENCES

( * ) Notice: Subject to any disclaimer, the term of this patent is extended or adjusted under 35 U.S.C. 154(b) by 0 days.

(21) Appl. No.: 17/779,590

(22) PCT Filed: Mar. 5, 2020

(86) PCT No.: PCT/CN2020/077875
§ 371 (c)(1),
(2) Date: May 25, 2022

(87) PCT Pub. No.: WO2021/103339
PCT Pub. Date: Jun. 3, 2021

(65) Prior Publication Data
US 2023/0001352 A1    Jan. 5, 2023

(30) Foreign Application Priority Data
Nov. 29, 2019 (CN) .......................... 201911198780.4

(51) Int. Cl.
*B01D 53/34* (2006.01)
*B01D 53/70* (2006.01)
(Continued)

(52) U.S. Cl.
CPC ......... *B01D 53/869* (2013.01); *B01D 53/343* (2013.01); *B01D 53/70* (2013.01);
(Continued)

(58) Field of Classification Search
CPC .... B01D 53/869; B01D 53/343; B01D 53/70; B01D 53/8631; B01D 53/90;
(Continued)

(56) References Cited

U.S. PATENT DOCUMENTS 4,940,478 A    7/1990  Naber et al.

FOREIGN PATENT DOCUMENTS

CN    101893387          11/2010
CN    202 343 093 U  *   7/2012
(Continued)

OTHER PUBLICATIONS

Li, "The Baghouse System of Consteel Eaf," Industrial Safety and Environmental Protection, vol. 29, No. 7, 2003, pp. 13-16.
(Continued)

*Primary Examiner* — Timothy C Vanoy
(74) *Attorney, Agent, or Firm* — McDonald Hopkins LLC

(57) ABSTRACT

Disclosed are a flue gas purification and waste heat utilization system and method. The system comprises a flue gas exhaust unit, a primary waste heat utilization unit, a primary flue gas purification unit, a secondary waste heat utilization unit and a secondary flue gas purification unit that are sequentially connected in a flue gas flow direction, wherein the primary flue gas purification unit is configured for removing $NO_x$, large particles and CO in the flue gas, the secondary flue gas purification unit is configured for removing $NO_x$ and dioxin in the flue gas, an ammonia-spraying device is externally connected between the flue gas exhaust unit and the primary waste heat utilization unit, and the ammonia-spraying device is configured for injecting ammo-
(Continued)

nia gas into the flue gas exhausted from the flue gas exhaust unit.

10 Claims, 1 Drawing Sheet

(51) Int. Cl.
    *B01D 53/86*    (2006.01)
    *B01D 53/90*    (2006.01)
    *F27D 17/00*    (2006.01)

(52) U.S. Cl.
    CPC ......... *B01D 53/8631* (2013.01); *B01D 53/90* (2013.01); *F27D 17/001* (2013.01); *F27D 17/004* (2013.01); *B01D 2251/2062* (2013.01); *B01D 2257/2064* (2013.01); *B01D 2257/404* (2013.01); *B01D 2257/502* (2013.01); *B01D 2258/025* (2013.01); *B01D 2258/0283* (2013.01)

(58) Field of Classification Search
    CPC .... B01D 2251/2062; B01D 2257/2064; B01D 2257/404; B01D 2257/502; B01D 2258/025; B01D 2258/0283; B01D 2257/93; C21C 5/565; C21C 5/38; C21C 2100/02; C21C 2100/06
See application file for complete search history.

(56) References Cited

FOREIGN PATENT DOCUMENTS

| CN | 105972605 | | 9/2016 | | |
|---|---|---|---|---|---|
| CN | 106402898 | | 2/2017 | | |
| CN | 107 261 830 | A | * 10/2017 | ......... | B01D 53/8662 |
| CN | 108088271 | | 5/2018 | | |
| CN | 110 699 512 | A | * 1/2020 | ............ | C21C 5/565 |
| CN | 110793338 | | 2/2020 | | |
| KR | 100 460 665 | B1 | * 12/2004 | ............ | B01J 21/063 |
| KR | 101 713 955 | B1 | * 3/2017 | ............ | C21C 5/562 |

OTHER PUBLICATIONS

Patent Cooperation Treaty (PCT), International Search Report and Written Opinion for Application PCT/CN2020/077875 filed on Mar. 5, 2020, dated Aug. 13, 2020, International Searching Authority, CN.
State Intellectual Property Office of People's Republic of China, Notification of First Office Action for Application No. 2019111987804, China.
State Intellectual Property Office of People's Republic of China, Notification of Second Office Action for Application No. 2019111987804, China.
State Intellectual Property Office of People's Republic of China, First Search Report for Application No. 2019111987804, China.

* cited by examiner

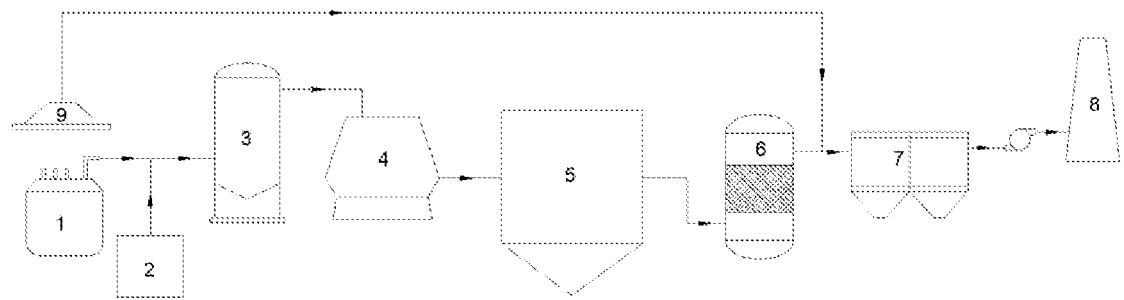

FLUE GAS PURIFICATION AND WASTE HEAT UTILIZATION SYSTEM AND METHOD

CROSS-REFERENCE TO RELATED APPLICATIONS

This application is a U.S. National Stage Application, filed under 35 U.S.C. 371 of International Patent Application No. PCT/CN2020/077875 filed on Mar. 5, 2020, which claims priority to Chinese Patent Application No. 201911198780.4 filed with the China National Intellectual Property Administration (CNIPA) on Nov. 29, 2019, the disclosure of which are incorporated herein by reference in their entireties.

TECHNICAL FIELD

The present application belongs to the technical field of flue gas treatment, relates to a flue gas purification and waste heat utilization system and method, such as a flue gas deep purification and waste heat multi-effect utilization system and method.

BACKGROUND

Electric arc furnace (EAF) steelmaking is the fourth largest dioxin emission source in China. Dioxin is known as the most toxic substance in the world, whose toxicity is 1000 times more that of potassium cyanide. The steel production capacity of EAF steelmaking currently accounts for about 10% of the total steel production capacity in China. In recent years, the country has actively encouraged the development of EAF steelmaking, planning to raise the proportion of EAF steel to 20% and to reduce the energy consumption of EAF smelting by 10% by the end of 2025. On the one hand, the increase in the output of EAF steel will inevitably increase the dioxins emission, which demands stricter control of dioxin emission from the EAF flue gas; on the other hand, the temperature of EAF flue gas is high, and the energy consumption of steel production can be effectively reduced by recycling the waste heat of the flue gas. In terms of dioxin control, the control technology is mainly flue gas quenching technology for dioxin in EAF flue gas. Although this technology can effectively control the dioxin emission, it cannot recycle the waste heat of the flue gas. In terms of waste heat utilization of EAF flue gas, the scrap steel preheating has been proven to effectively reduce steelmaking energy consumption, but the preheating process will lead to the dioxins formation. Waste heat boiler technology can effectively recycle heat, but dioxin resynthesis will occur in its operating range (200° C. to 800° C.). Therefore, the existing flue gas treatment process cannot meet the needs of emission reduction and energy conservation at the same time. Additionally, with the increasingly strict environmental protection standards, $NO_x$ in flue gas also faces the demand for emission reduction. Hence, there is a need for a new-style EAF flue gas treatment process coupling emission reduction with energy conservation.

CN203772039U discloses an EAF flue gas waste heat utilization and high-efficiency filtration combined purification system, including an EAF, a flue gas treatment device, a dust removal device, a main fan and a chimney connected in sequence through pipelines. The flue gas treatment device included a high-temperature flue gas treatment section and a medium-low temperature flue gas treatment section, in which after the treatment of the high temperature flue gas treatment section, the flue gas was introduced in the medium-low temperature flue gas treatment section for treatment, and after the treatment of the high temperature flue gas treatment section, a temperature of the flue gas was not lower than 450° C., and after the treatment of the medium-low temperature flue gas treatment section, a temperature of the flue gas was not higher than 250° C.

CN104807341A discloses a system for purifying the EAF flue gas and utilizing the waste heat at the same time, including an EAF, a scrap steel preheating device, a fourth-hole exhaust pipeline, a quenching tower, a dust collector, an wind drawing fan and a chimney connected in sequence.

CN109631597A discloses an ultra-high-power EAF flue gas purification and heat energy utilization system, including a roof circulation cover, a exhaust platform guide cover, a secondary flue gas outside the furnace, a primary flue gas inside the furnace, a primary settling chamber, a booster fan, a secondary settling chamber, a waste heat recycle device, a pulse bag dust filter, a dust centralized collection and an exhaust pipeline.

Although the prior art disclosed lots of flue gas purification and preheating utilization systems and related processes, the problem of dioxins resynthesis has not been effectively solved in the deep purification of flue gas, and the waste heat utilization degree and the purification depth are unsatisfactory.

SUMMARY

The following is a summary of the subject detailed in the present application. The summary is not intended to limit the protection scope of the claims.

An object of the present application is to provide a flue gas purification and waste heat utilization system and a flue gas purification and waste heat utilization method. In the present application, deep purification is realized for the highly toxic substance dioxin and conventional pollutant $NO_x$ in flue gas, satisfying the ultra-low emission standards required in the steel industry. The heat of the flue gas is subjected to multi-effect utilization by a scrap steel preheating device and a waste heat boiler, which saves the energy consumption in the EAF steelmaking, and reduces the cost of the EAF steelmaking. By injecting $NH_3$ into the flue gas, the effect of removing $NO_x$ is achieved, and meanwhile, dioxin is effectively inhibited from being resynthesized in the waste heat boiler, realizing synergistic purification of pollutants. The process route provided in the present application realizes the coupling between pollutant emission reduction and energy conservation effect.

In order to achieve the object, the present application adopts the technical solutions described below.

In a first aspect, a flue gas purification and waste heat utilization system is provided in the present application, including a flue gas exhaust unit, a primary waste heat utilization unit, a primary flue gas purification unit, a secondary waste heat utilization unit, and a secondary flue gas purification unit sequentially connected in a flue gas flow direction, in which the primary flue gas purification unit is used for removing $NO_x$, large particles and CO in the flue gas, and the secondary flue gas purification unit is used for removing $NO_x$ and dioxin in the flue gas.

An ammonia-injecting device is externally connected between the flue gas exhaust unit and the primary waste heat utilization unit, in which the ammonia-injecting device is used for injecting ammonia gas into the flue gas exhausted from the flue gas exhaust unit.

In the present application, deep purification is realized for the highly toxic substance dioxin and conventional pollutant $NO_x$ in flue gas, meeting the ultra-low emission standards required in the steel industry. By injecting $NH_3$ into the flue gas, the effect of removing $NO_x$ is achieved, and meanwhile, dioxin is effectively inhibited from being resynthesized in the waste heat boiler, realizing synergistic purification of pollutants. The process route provided in the present application achieves the coupling between pollutant emission reduction and energy conservation effect.

As an optional technical solution of the present application, the flue gas exhaust unit includes an EAF.

Optionally, the primary waste heat utilization unit includes a scrap steel preheating device.

Optionally, the primary flue gas purification unit includes a combustion settling chamber.

Optionally, the secondary waste heat utilization unit includes a waste heat boiler.

Optionally, the secondary flue gas purification unit includes a catalytic reaction device.

In the present application, every flue gas purification unit and waste heat utilization unit is specially selected and rationally connected, so that a perfect upstream-downstream cooperation relationship is formed among various processed of the entire flue gas purification and waste heat utilization system, and deep purification and multi-effect utilization of the flue gas are further achieved. The specific scheme is described below.

(1) The flue gas preheats the scrap steel through the scrap steel preheating device, the particles in the flue gas is partially captured in the scrap steel preheating device and then sent to the EAF together with the scrap steel for smelting, and the unreacted $NH_3$ injected upstream can effectively inhibit the dioxins formation in the process of scrap preheating.

(2) The flue gas is subjected to the CO secondary combustion in the combustion settling chamber, the particles is removed by settling under gravity, and the heated flue gas enters the waste heat boiler for recycling heat.

(3) When the heat recycle is performed in the waste heat boiler, the dioxins resynthesis will occur during the cooling process of the flue gas; the unreacted $NH_3$ injected at the front section can effectively inhibit the resynthesis process of dioxins in this temperature range, achieving process control, and achieving dioxin emission reduction through process control.

(4) The catalyst used in the catalytic reaction device is a medium-temperature selective catalytic reduction (SCR) catalyst, the unreacted $NO_x$ and $NH_3$ in the flue gas are further removed by SCR reaction, and the dioxin in the flue gas is subjected to catalytic decomposition to achieve deep purification.

As an optional technical solution of the present application, the system further includes a dust removal device, a wind drawing device and a chimney sequentially connected to the catalytic reaction device.

Optionally, the dust removal device is a bag filter.

As an optional technical solution of the present application, the flue gas purification and waste heat utilization system includes an EAF, a scrap steel preheating device, a combustion settling chamber, a waste heat boiler, a catalytic reaction device, a dust removal device, a wind drawing device and a chimney sequentially connected in a flue gas flow direction.

Optionally, the scrap steel preheating device is connected to a fourth hole of the EAF.

As an optional technical solution of the present application, a flue gas cover is arranged over the EAF, in which the flue gas cover is used for collecting flue gas escaping from the EAF.

Optionally, the flue gas cover is connected to an escaped flue gas pipeline, and an outlet end of the escaped flue gas pipeline is connected between the catalytic reaction device and the dust removal device, in which the escaped flue gas from the EAF is collected by the flue gas cover, passes through the escaped flue gas pipeline, mixed with the purified flue gas exhausted from the catalytic reaction device and then enters the dust removal device.

In a second aspect, a flue gas purification and waste heat utilization method is provided in the present application, which uses the flue gas purification and waste heat utilization system according to the first aspect to perform deep purification on the flue gas and perform multi-effect utilization on the waste heat of the flue gas.

As an optional technical solution of the present application, the method includes:

injecting ammonia gas into the flue gas drawn from the flue gas exhaust unit by the ammonia-injecting device, performing a reaction for removing $NO_x$ in the flue gas, and then subjecting the flue gas to processes of the primary waste heat unit, the primary flue gas purification unit, the secondary waste heat utilization unit and the secondary flue gas purification unit in sequence, so as to remove CO, $NO_x$, large particles, dioxin and dust in the flue gas and realize multi-effect utilization of the waste heat of the flue gas.

As an optional technical solution of the present application, the method specifically includes the following steps:

S1 drawing the flue gas generated from the EAF by the wind drawing device, injecting ammonia gas into the flue gas by the ammonia-injecting device to perform selective non-catalytic reduction (SNCR) reaction for removing part of $NO_x$ in the flue gas, and introducing the unreacted ammonia gas to the scrap steel preheating device with the flue gas;

S2 in the scrap steel preheating device, subjecting the flue gas to heat exchange with the scrap steel, wherein the scrap steel is heated, so as to realize primary utilization of the waste heat of the flue gas, and introducing the cooled flue gas to the combustion settling chamber;

S3 in the combustion settling chamber, subjecting the flue gas to combustion for removing CO, wherein large particles in the flue gas settle down under gravity, and introducing the heated flue gas to the waste heat boiler;

S4 in the waste heat boiler, using the heat from the flue gas to heat the medium of the waste heat boiler, so as to realize secondary utilization of the waste heat of the flue gas, wherein the synthesis of dioxin is inhibited by the unreacted ammonia gas injected upstream, and introducing the cooled flue gas to the catalytic reaction device;

S5 in the catalytic reaction device, subjecting $NO_x$ in the flue gas and the unreacted ammonia gas injected upstream to SCR reaction, and simultaneously subjecting dioxin in the flue gas to catalytic decomposition, so as to realize deep purification of the flue gas; and S6 mixing the purified flue gas and the escaped flue gas which the flue gas cover collects from the boiler, then removing the particles in the mixture by the dust removal device, and finally discharging the flue gas through the chimney.

In the present application, the flue gas is drawn from the fourth hole of the EAF by the wind drawing device, $NH_3$ is injected into the flue to perform SNCR reaction for removing part of $NO_x$, then the flue gas passes through the scrap steel preheating device, the hot flue gas and the scrap steel are subjected to heat exchange for preheating the scrap steel, and the unreacted $NH_3$ injected upstream can effectively inhibit the dioxins generation in the scrap steel preheating process; then the flue gas passes through the combustion settling chamber, particles are partially removed by settling under gravity, and CO is removed by secondary combustion; then the flue gas heat is recycled by waste heat boiler to be used in power generation, during which the flue gas is cooled, and the unreacted $NH_3$ injected upstream can inhibit the dioxins synthesis in such process; the cooled flue gas passed through the catalytic reaction device, the unreacted $NH_3$ and the residual $NO_x$ in the flue gas are subjected to SCR reaction for further removal, and the dioxin in the flue gas is subjected to catalytic oxidation reaction to be decomposed, realizing deep purification of $NO_x$ and dioxin; the purified flue gas and the escaped flue gas collected by the flue gas cover are mixed, and gets rid of particles by the dust removal device, and finally is discharged through the chimney. The flue gas purification and waste heat utilization process provided in the present application can realize deep purification of particles, $NO_x$ and dioxin in the flue gas of the EAF, and utilize the waste heat of the flue gas in various ways, realizing the coupling between pollutant emission reduction and energy conservation.

As an optional technical solution of the present application, in step S1, the flue gas drawn by the wind drawing device is generated from a fourth hole of the EAF.

Optionally, a temperature of the flue gas is 1200° C. to 1400° C., such as 1200° C., 1210° C., 1220° C., 1230° C., 1240° C., 1250° C., 1260° C., 1270° C., 1280° C., 1290° C., 1300° C., 1310° C., 1320° C., 1330° C., 1340° C., 1350° C., 1360° C., 1370° C., 1380° C., 1390° C. or 1400° C., but not limited to the listed values, and other unlisted values within the range are equally applicable.

Optionally, a flow rate of the flue gas is 200000 $m^3$/h to 500000 $m^3$/h, for example, 200000 $m^3$/h, 250000 $m^3$/h, 300000 $m^3$/h, 350000 $m^3$/h, 400000 $m^3$/h, 450000 $m^3$/h or 500000 $m^3$/h, but not limited to the listed values, and other unlisted values within the range are equally applicable.

Optionally, the flue gas includes one or a combination of at least two of dust, CO, $NO_x$, or dioxin.

Optionally, a dust concentration in the flue gas is 10 $g/m^3$ to 20 $g/m^3$, such as 10 $g/m^3$, 11 $g/m^3$, 12 $g/m^3$, 13 $g/m^3$, 14 $g/m^3$, 15 $g/m^3$, 16 $g/m^3$, 17 $g/m^3$, 18 $g/m^3$, 19 $g/m^3$ or 20 $g/m^3$, but not limited to the listed values, and other unlisted values within the range are equally applicable.

Optionally, a CO concentration in the flue gas is 0% to 20%, such as 0%, 1%, 2%, 3%, 4%, 5%, 6%, 7%, 8%, 9%, 10%, 11%, 12%, 13%, 14%, 15%, 16%, 17%, 18%, 19% or 20%, but not limited to the listed values, and other unlisted values within the range are equally applicable.

Optionally, a dioxin content in the flue gas is 0 ng-TEQ/$m^3$ to 10 ng-TEQ/$m^3$, such as 0 ng-TEQ/$m^3$, 1 ng-TEQ/$m^3$, 2 ng-TEQ/$m^3$, 3 ng-TEQ/$m^3$, 4 ng-TEQ/$m^3$, 5 ng-TEQ/$m^3$, 6 ng-TEQ/$m^3$, 7 ng-TEQ/$m^3$, 8 ng-TEQ/$m^3$, 9 ng-TEQ/$m^3$ or 10 ng-TEQ/$m^3$, but not limited to the listed values, and other unlisted values within the range are equally applicable.

Optionally, a $NO_x$ content in the flue gas is 0 ppm to 2800 ppm, such as 200 ppm, 400 ppm, 600 ppm, 800 ppm, 1000 ppm, 1200 ppm, 1400 ppm, 1600 ppm, 1800 ppm, 2000 ppm, 2200 ppm, 2400 ppm, 2600 ppm or 2800 ppm, but not limited to the listed values, and other unlisted values within the range are equally applicable.

Optionally, a ratio of the injected ammonia gas to $NO_x$ in the flue gas is controlled within 1.4 to 1.6, such as 1.40, 1.41, 1.42, 1.43, 1.44, 1.45, 1.46, 1.47, 1.48, 1.49, 1.50, 1.51, 1.52, 1.53, 1.54, 1.55, 1.56, 1.57, 1.58, 1.59 or 1.60, but not limited to the listed values, and other unlisted values within the range are equally applicable.

Optionally, after the SNCR reaction, a removal rate of $NO_x$ is 50% to 70%, such as 50%, 51%, 52%, 53%, 54%, 55%, 56%, 57%, 58%, 59%, 60%, 61%, 62%, 63%, 64%, 65%, 66%, 67%, 68%, 69% or 70%, but not limited to the listed values, and other unlisted values within the range are equally applicable.

Optionally, in step S2, after the heat exchange between the flue gas and the scrap steel, the scrap steel is heated to a temperature of 400° C. to 600° C., such as 400° C., 410° C., 420° C., 430° C., 440° C., 450° C., 460° C., 470° C., 480° C., 490° C., 500° C., 510° C., 520° C., 530° C., 540° C., 550° C., 560° C., 570° C., 580° C., 590° C. or 600° C., but not limited to the listed values, and other unlisted values within the range are equally applicable.

Optionally, in step S3, a combustion temperature of the flue gas is 500° C. to 700° C. in the combustion settling chamber, such as 500° C., 510° C., 520° C., 530° C., 540° C., 550° C., 560° C., 570° C., 580° C., 590° C., 600° C., 610° C., 620° C., 630° C., 640° C., 650° C., 660° C., 670° C., 680° C., 690° C. or 700° C., but not limited to the listed values, and other unlisted values within the range are equally applicable.

Optionally, in step S4, the flue gas is cooled to a temperature of 200° C. to 250° C. in the waste heat boiler, such as 200° C., 205° C., 210° C., 215° C., 220° C., 225° C., 230° C., 235° C., 240° C., 245° C. or 250° C., but not limited to the listed values, and other unlisted values within the range are equally applicable.

In the present application, the inlet flue gas temperature of the catalytic reaction device needs to be strictly controlled at 200° C. to 250° C., because only under such temperature condition, the catalyst can have good SCR reaction activity and dioxin catalytic oxidation performance, and since the flue gas temperature is lower than the resynthesis temperature range of dioxins, the decomposed dioxins cannot be resynthesized, thus achieving deep purification.

Optionally, in step S5, after the SCR reaction, a removal rate of $NO_x$ is 80% to 90% in the flue gas, such as 80%, 81%, 82%, 83%, 84%, 85%, 86%, 87%, 88%, 89% or 90%, but not limited to the listed values, and other unlisted values within the range are equally applicable.

Optionally, in step S6, the escaped flue gas escapes from an electrode hole, a furnace door or an observation opening of the EAF.

Optionally, a flow rate of the escaped flue gas is 500000 $m^3$/h to 1500000 $m^3$/h, such as 500000 $m^3$/h, 600000 $m^3$/h, 700,000 $m^3$/h, 800000 $m^3$/h, 900000 $m^3$/h, 1000000 $m^3$/h, 1100000 $m^3$/h, 1200000 $m^3$/h, 1300000 $m^3$/h, 1400000 $m^3$/h or 1500000 $m^3$/h, but not limited to the listed values, and other unlisted values within the range are equally applicable.

Optionally, a temperature of the escaped flue gas is 60° C. to 100° C., such as 60° C., 65° C., 70° C., 75° C., 80° C., 85° C., 90° C., 95° C. or 100° C., but not limited to the listed values, and other unlisted values within the range are equally applicable.

Optionally, a dust concentration in the escaped flue gas is 0 $g/m^3$ to 5 $g/m^3$, such as 0 $g/m^3$, 0.5 $g/m^3$, 1 $g/m^3$, 1.5 $g/m^3$, 2 $g/m^3$, 2.5 $g/m^3$, 3 $g/m^3$, 3.5 $g/m^3$, 4 $g/m^3$, 4.5 $g/m^3$ or 5 $g/m^3$, but not limited to the listed values, and other unlisted values within the range are equally applicable.

Optionally, a dioxin content in the escaped flue gas is 0 ng-TEQ/$m^3$ to 0.5 ng-TEQ/$m^3$, such as 0 ng-TEQ/$m^3$, 0.1 ng-TEQ/$m^3$, 0.2 ng-TEQ/$m^3$, 0.3 ng-TEQ/$m^3$, 0.4 ng-TEQ/ m³ or 0.5 ng-TEQ/m³, but not limited to the listed values, and other unlisted values within the range are equally applicable.

As an optional technical solution of the present application, the method specifically includes the following steps:

S1 drawing the flue gas generated from the fourth hole of the EAF by the wind drawing device, in which the flow rate of the flue gas is 200000 m³/h to 500000 m³/h, the temperature of the flue gas is 1200° C. to 1400° C., and the flue gas exhausted from the fourth hole of the EAF includes one or a combination of at least two of dust, CO, $NO_x$ or dioxin, in which the dust concentration is 10 g/m³ to 20 g/m³, the CO concentration is 0% to 20%, the dioxin content is 0 ng-TEQ/m³ to 10 ng-TEQ/m³, and the $NO_x$ content is 0 ppm to 2800 ppm, injecting ammonia gas into the flue gas by the ammonia-injecting device to perform SNCR reaction for removing $NO_x$ of 50% to 70% in the flue gas, in which the ratio of the injected ammonia gas to $NO_x$ in the flue gas is controlled within 1.4 to 1.6, and introducing the unreacted ammonia gas to the scrap steel preheating device with the flue gas;

S2 in the scrap steel preheating device, subjecting the flue gas to heat exchange with the scrap steel, in which the scrap steel is heated to 400° C. to 600° C., so as to realize primary utilization of the waste heat of the flue gas, and introducing the cooled flue gas to the combustion settling chamber;

S3 in the combustion settling chamber, subjecting the flue gas to combustion at 500° C. to 700° C. for removing CO, in which large particles in the flue gas settle down under gravity, and introducing the heated flue gas to the waste heat boiler;

S4 in the waste heat boiler, using the heat from the flue gas to heat the medium of the waste heat boiler, in which the flue gas is cooled to 200° C. to 250° C., so as to realize secondary utilization of the waste heat of the flue gas, and the synthesis of dioxin is inhibited by the unreacted ammonia gas injected upstream, and introducing the cooled flue gas to the catalytic reaction device;

S5 in the catalytic reaction device, subjecting $NO_x$ in the flue gas and the unreacted ammonia gas injected upstream to SCR reaction, in which 80% to 90% of the $NO_x$ is removed in the flue gas, and simultaneously subjecting dioxin in the flue gas to catalytic decomposition, so as to realize deep purification of the flue gas; and S6 collecting the flue gas escaping from the electrode hole, the furnace door or the observation opening of the EAF by the flue gas cover, passing the escaped flue gas through an escaped flue gas pipeline, mixing the escaped flue gas and the purified flue gas exhausted from the catalytic reaction device, then removing the particles in the mixture by the dust removal device, and finally discharging the flue gas through the chimney, in which the flow rate of the escaped flue gas is 500000 m³/h to 1500000 m³/h, the temperature of the escaped flue gas is 60° C. to 100° C., the dust concentration in the escaped flue gas is 0 g/m³ to 5 g/m³, and the dioxin content is 0 ng-TEQ/m³ to 0.5 ng-TEQ/m³.

The value range in the present application not only includes the listed point values, but also includes any unlisted point value within the value range. For space limitation and conciseness reasons, the specific point values included in the range will not be listed exhaustively.

The system refers to an equipment system, a device system or a production device.

Compared with the prior art, the beneficial effect of the present application includes that:

in the present application, deep purification is realized for the highly toxic substance dioxin and conventional pollutant $NO_x$ in flue gas, satisfying the ultra-low emission standards required in the steel industry; the heat of the flue gas is subjected to multi-effect utilization by a scrap steel preheating device and a waste heat boiler, which saves the energy consumption in the EAF steelmaking, and reduces the cost of the EAF steelmaking; by injecting $NH_3$ into the flue gas, the effect of removing $NO_x$ is achieved, and meanwhile, dioxin is effectively inhibited from being resynthesized in the waste heat boiler, realizing synergistic purification of pollutants; the process route provided in the present application realizes the coupling between pollutant emission reduction and energy conservation effect.

Other aspects will become apparent upon reading and understanding the detailed description and the drawing.

BRIEF DESCRIPTION OF DRAWINGS

FIG. 1 is a schematic structural diagram of a flue gas purification and waste heat utilization system provided in an example of the present application.

REFERENCE LIST

1-EAF; 2-scrap steel preheating device; 3-combustion settling chamber; 4-waste heat boiler; 5-catalytic reaction device; 6-dust removal device; 7-wind drawing device; 8-chimney; and 9-flue gas cover.

DETAILED DESCRIPTION

It should be understood that, in the description of the present application, the terms "central", "lengthways", "crosswise", "over", "under", "front", "back", "left", "right", "vertical", "horizontal", "top", "bottom", "inner", "outer" and the like indicate an orientation or a positional relationship based on an orientation or a positional relationship shown in accompanying drawings, which is only used for describing the present application conveniently and simplifying the description, rather than indicating or implying that the device or unit referred to necessarily have a particular orientation or be arranged and operated in a particular orientation, and thereby should not be construed as a limitation to the present application. In addition, the terms "primary", "secondary" and the like are only used for descriptive purposes, and should not be construed as indicating or implying relative importance, or indicating or implying a number of the indicated technical feature. Hence, a feature defined as "primary", "secondary" or the like may expressly or implicitly include one or more of the features. In the description of the present application, unless otherwise specified, "a plurality of" refers to two or more than two.

It should be noted that, in the description of the present application, unless otherwise specified or defined particularly, the terms "arrange", "link" and "connect" should be understood in a broad sense; for example, there may be a fixed connection, a detachable connection, or an integral connection; there may be a mechanical connection or an electrical connection; and there may be a direct connection, an indirect connection through an intermediate medium, or an internal communication between two components. For those skilled in the art, specific meanings of the above terms in the present application can be understood through specific situations.

The technical solution of the present application is further described below with reference to the accompanying drawing and through specific embodiments.

In a specific embodiment, a flue gas purification and waste heat utilization system is provided in the present application, as shown in FIG. 1, including a flue gas exhaust unit, a primary waste heat utilization unit, a primary flue gas purification unit, a secondary waste heat utilization unit, and a secondary flue gas purification unit sequentially connected in a flue gas flow direction; the primary flue gas purification unit is used for removing $NO_x$, large particles and CO in the flue gas, and the secondary flue gas purification unit is used for removing $NO_x$ and dioxin in the flue gas. An ammonia-injecting device is externally connected between the flue gas exhaust unit and the primary waste heat utilization unit, and the ammonia-injecting device is used for injecting ammonia gas into the flue gas exhausted from the flue gas exhaust unit. Each unit specifically includes the following equipment: the flue gas exhaust unit includes an EAF 1, the primary waste heat utilization unit includes a scrap steel preheating device 2, the primary flue gas purification unit includes a combustion settling chamber 3, the secondary waste heat utilization unit includes a waste heat boiler 4, and the secondary flue gas purification unit includes a catalytic reaction device 5. The system further includes a dust removal device 6, a wind drawing device 7 and a chimney 8 sequentially connected after the catalytic reaction device 5; specifically, the dust removal device 6 provided in the present application is preferably selected from a bag dust filter.

As a system which can be specifically put into actual production, the flue gas purification and waste heat utilization system provided in the present application specifically includes an EAF 1, a scrap steel preheating device 2, a combustion settling chamber 3, a waste heat boiler 4, a catalytic reaction device 5, a dust removal device 6, a wind drawing device 7 and a chimney 8 sequentially connected in a flue gas flow direction, in which the scrap steel preheating device 2 is connected to a fourth hole of the EAF 1. An ammonia-injecting device is externally connected between the EAF 1 and the scrap steel preheating device 2, and the ammonia-injecting device is used for injecting ammonia gas into the flue gas exhausted from the EAF 1. Furthermore, a flue gas cover 9 is arranged over the EAF 1, and the flue gas cover 9 is used for collecting the flue gas escaping from the EAF 1. The flue gas cover 9 is connected to an escaped flue gas pipeline, and an outlet end of the escaped flue gas pipeline is connected between the catalytic reaction device 5 and the dust removal device 6; the escaped flue gas from the EAF 1 is collected by the flue gas cover 9, passes through the escaped flue gas pipeline, mixed with the purified flue gas exhausted from the catalytic reaction device 5 and then enters the dust removal device 6.

In another specific embodiment, a flue gas purification and waste heat utilization method is provided in the present application, which uses a flue gas purification and waste heat utilization system provided by a specific embodiment to perform deep purification on the flue gas and perform multi-effect utilization on the waste heat of the flue gas. The method specifically includes the steps described below.

S1 A wind drawing device 7 draws the flue gas generated from a fourth hole of an EAF 1, in which a flow rate of the flue gas is 200000 $m^3/h$ to 500000 $m^3/h$, a temperature of the flue gas is 1200° C. to 1400° C., and the flue gas exhausted from the fourth hole of the EAF 1 includes one or a combination of at least two of dust, CO, $NO_x$ or dioxin, in which a dust concentration is 10 $g/m^3$ to 20 $g/m^3$, a CO concentration is 0% to 20%, a dioxin content is 0 ng-TEQ/$m^3$ to 10 ng-TEQ/$m^3$, and a $NO_x$ content is 0 ppm to 2800 ppm; an ammonia-injecting device injects ammonia gas into the flue gas to perform SNCR reaction for removing $NO_x$ of 50% to 70% in the flue gas, in which a ratio of the injected ammonia gas to $NO_x$ in the flue gas is controlled within 1.4 to 1.6; the unreacted ammonia gas is introduced to a scrap steel preheating device 2 with the flue gas.

S2 In the scrap steel preheating device 2, the flue gas is subjected to heat exchange with the scrap steel, in which the scrap steel is heated to 400° C. to 600° C., so as to realize primary utilization of the waste heat of the flue gas; the cooled flue gas is introduced to a combustion settling chamber 3.

S3 In the combustion settling chamber 3, the flue gas is subjected to combustion at 500° C. to 700° C. for removing CO, in which large particles in the flue gas settle down under gravity; the heated flue gas is introduced to a waste heat boiler 4.

S4 In the waste heat boiler 4, the heat from the flue gas is used to heat the medium of the waste heat boiler 4, in which the flue gas is cooled to 200° C. to 250° C., so as to realize secondary utilization of the waste heat of the flue gas, and the synthesis of dioxin is inhibited by the unreacted ammonia gas injected upstream; the cooled flue gas is introduced in a catalytic reaction device 5.

S5 In the catalytic reaction device 5, $NO_x$ in the flue gas and the unreacted ammonia gas injected upstream are subjected to SCR reaction, in which 80% to 90% of the $NO_x$ is removed in the flue gas; dioxin in the flue gas is simultaneously subjected to catalytic decomposition, so as to realize deep purification of the flue gas.

S6 The flue gas escaping from an electrode hole, a furnace door or an observation opening of the EAF 1 is collected by a flue gas cover 9, passes through an escaped flue gas pipeline, mixes with the purified flue gas exhausted from the catalytic reaction device 5, then gets rid of the particles by a dust removal device 6, and finally is discharged through a chimney 8, in which a flow rate of the escaped flue gas is 500000 $m^3/h$ to 1500000 $m^3/h$, a temperature of the escaped flue gas is 60° C. to 100° C., a dust concentration in the escaped flue gas is 0 $g/m^3$ to 5 $g/m^3$, and a dioxin content is 0 ng-TEQ/$m^3$ to 0.5 ng-TEQ/$m^3$.

Example 1

A flue gas purification and waste heat utilization method is provided in this example, which used a flue gas purification and waste heat utilization system provided by a specific embodiment to perform deep purification on the flue gas and perform multi-effect utilization on the waste heat of the flue gas. The method specifically included the steps described below.

S1 A wind drawing device 7 drew the flue gas generated from a fourth hole of an EAF 1, in which a flow rate of the flue gas was 200000 $m^3/h$, a temperature of the flue gas was 1200° C., and the flue gas exhausted from the fourth hole of the EAF 1 included one or a combination of at least two of dust, CO, $NO_x$ or dioxin, in which a dust concentration was 10 $g/m^3$, a CO concentration was 1%, a dioxin content was 2 ng-TEQ/$m^3$, and a $NO_x$ content was 200 ppm; an ammonia-injecting device injected ammonia gas into the flue gas to perform SNCR reaction for removing 50% $NO_x$ in the flue gas, in which a ratio of the injected ammonia gas to $NO_x$ in the flue gas was controlled at 1.4; the unreacted ammonia gas was introduced to a scrap steel preheating device 2 with the flue gas.

S2 In the scrap steel preheating device 2, the flue gas was subjected to heat exchange with the scrap steel, in which the scrap steel was heated to 400° C., so as to realize primary utilization of the waste heat of the flue gas; the cooled flue gas was introduced to a combustion settling chamber 3.

S3 In the combustion settling chamber 3, the flue gas was subjected to combustion at 500° C. for removing CO, in which large particles in the flue gas settled down under gravity; the heated flue gas was introduced to a waste heat boiler 4.

S4 In the waste heat boiler 4, the heat from the flue gas was used to heat the medium of the waste heat boiler 4, in which the flue gas was cooled to 200° C., so as to realize secondary utilization of the waste heat of the flue gas, and the synthesis of dioxin was inhibited by the unreacted ammonia gas injected upstream; the cooled flue gas was introduced in a catalytic reaction device 5.

S5 In the catalytic reaction device 5, $NO_x$ in the flue gas and the unreacted ammonia gas injected upstream were subjected to SCR reaction, in which 80% of the $NO_x$ was removed in the flue gas; dioxin in the flue gas was simultaneously subjected to catalytic decomposition, so as to realize deep purification of the flue gas.

S6 The flue gas escaping from an electrode hole, a furnace door or an observation opening of the EAF 1 was collected by a flue gas cover 9, passed through an escaped flue gas pipeline, mixed with the purified flue gas exhausted from the catalytic reaction device 5, then got rid of the particles by a dust removal device 6, and finally was discharged through a chimney 8, in which a flow rate of the escaped flue gas was 500000 $m^3$/h, a temperature of the escaped flue gas was 60° C., a dust concentration in the escaped flue gas was 1 $g/m^3$, and a dioxin content was 0.1 $ng\text{-}TEQ/m^3$.

The flue gas exhausted from the chimney was sampled and tested, of which the test results showed that: in the flue gas, the dust concentration was less than 10 $mg/m^3$, the CO concentration was less than 500 ppm, the dioxin content was less than 0.2 $ng\text{-}TEQ/m^3$, and the $NO_x$ content was less than 25 ppm.

Example 2

A flue gas purification and waste heat utilization method is provided in this example, which used a flue gas purification and waste heat utilization system provided by a specific embodiment to perform deep purification on the flue gas and perform multi-effect utilization on the waste heat of the flue gas. The method specifically included the steps described below.

S1 A wind drawing device 7 drew the flue gas generated from a fourth hole of an EAF 1, in which a flow rate of the flue gas was 250000 $m^3$/h, a temperature of the flue gas was 1250° C., and the flue gas exhausted from the fourth hole of the EAF 1 included one or a combination of at least two of dust, CO, $NO_x$ or dioxin, in which a dust concentration was 13 $g/m^3$, a CO concentration was 5%, a dioxin content was 4 $ng\text{-}TEQ/m^3$, and a $NO_x$ content was 700 ppm; an ammonia-injecting device injected ammonia gas into the flue gas to perform SNCR reaction for removing 55% $NO_x$ in the flue gas, in which a ratio of the injected ammonia gas to $NO_x$ in the flue gas was controlled at 1.45; the unreacted ammonia gas was introduced to a scrap steel preheating device 2 with the flue gas.

S2 In the scrap steel preheating device 2, the flue gas was subjected to heat exchange with the scrap steel, in which the scrap steel was heated to 450° C., so as to realize primary utilization of the waste heat of the flue gas; the cooled flue gas was introduced to a combustion settling chamber 3.

S3 In the combustion settling chamber 3, the flue gas was subjected to combustion at 550° C. for removing CO, in which large particles in the flue gas settled down under gravity; the heated flue gas was introduced to a waste heat boiler 4.

S4 In the waste heat boiler 4, the heat from the flue gas was used to heat the medium of the waste heat boiler 4, in which the flue gas was cooled to 220° C., so as to realize secondary utilization of the waste heat of the flue gas, and the synthesis of dioxin was inhibited by the unreacted ammonia gas injected upstream; the cooled flue gas was introduced in a catalytic reaction device 5.

S5 In the catalytic reaction device 5, $NO_x$ in the flue gas and the unreacted ammonia gas injected upstream were subjected to SCR reaction, in which 83% of the $NO_x$ was removed in the flue gas; dioxin in the flue gas was simultaneously subjected to catalytic decomposition, so as to realize deep purification of the flue gas.

S6 The flue gas escaping from an electrode hole, a furnace door or an observation opening of the EAF 1 was collected by a flue gas cover 9, passed through an escaped flue gas pipeline, mixed with the purified flue gas exhausted from the catalytic reaction device 5, then got rid of the particles by a dust removal device 6, and finally was discharged through a chimney 8, in which a flow rate of the escaped flue gas was 700000 $m^3$/h, a temperature of the escaped flue gas was 70° C., a dust concentration in the escaped flue gas was 2 $g/m^3$, and a dioxin content was 0.2 $ng\text{-}TEQ/m^3$.

The flue gas exhausted from the chimney was sampled and tested, of which the test results showed that: in the flue gas, the dust concentration was less than 10 $mg/m^3$, the CO concentration was less than 500 ppm, the dioxin content was less than 0.2 $ng\text{-}TEQ/m^3$, and the $NO_x$ content was less than 25 ppm.

Example 3

A flue gas purification and waste heat utilization method is provided in this example, which used a flue gas purification and waste heat utilization system provided by a specific embodiment to perform deep purification on the flue gas and perform multi-effect utilization on the waste heat of the flue gas. The method specifically included the steps described below.

S1 A wind drawing device 7 drew the flue gas generated from a fourth hole of an EAF 1, in which a flow rate of the flue gas was 300000 $m^3$/h, a temperature of the flue gas was 1300° C., and the flue gas exhausted from the fourth hole of the EAF 1 included one or a combination of at least two of dust, CO, $NO_x$ or dioxin, in which a dust concentration was 15 $g/m^3$, a CO concentration was 10%, a dioxin content was 6 $ng\text{-}TEQ/m^3$, and a $NO_x$ content was 1200 ppm; an ammonia-injecting device injected ammonia gas into the flue gas to perform SNCR reaction for removing 60% $NO_x$ in the flue gas, in which a ratio of the injected ammonia gas to $NO_x$ in the flue gas was controlled at 1.5; the unreacted ammonia gas was introduced to a scrap steel preheating device 2 with the flue gas.

S2 In the scrap steel preheating device 2, the flue gas was subjected to heat exchange with the scrap steel, in which the scrap steel was heated to 500° C., so as to realize primary utilization of the waste heat of the flue gas; the cooled flue gas was introduced to a combustion settling chamber 3.

S3 In the combustion settling chamber 3, the flue gas was subjected to combustion at 600° C. for removing CO, in which large particles in the flue gas settled down under gravity; the heated flue gas was introduced to a waste heat boiler 4.

S4 In the waste heat boiler 4, the heat from the flue gas was used to heat the medium of the waste heat boiler 4, in which the flue gas was cooled to 230° C., so as to realize secondary utilization of the waste heat of the flue gas, and the synthesis of dioxin was inhibited by the unreacted ammonia gas injected upstream; the cooled flue gas was introduced in a catalytic reaction device 5.

S5 In the catalytic reaction device 5, $NO_x$ in the flue gas and the unreacted ammonia gas injected upstream were subjected to SCR reaction, in which 85% of the $NO_x$ was removed in the flue gas; dioxin in the flue gas was simultaneously subjected to catalytic decomposition, so as to realize deep purification of the flue gas.

S6 The flue gas escaping from an electrode hole, a furnace door or an observation opening of the EAF 1 was collected by a flue gas cover 9, passed through an escaped flue gas pipeline, mixed with the purified flue gas exhausted from the catalytic reaction device 5, then got rid of the particles by a dust removal device 6, and finally was discharged through a chimney 8, in which a flow rate of the escaped flue gas was 1000000 $m^3$/h, a temperature of the escaped flue gas was 80° C., a dust concentration in the escaped flue gas was 3 $g/m^3$, and a dioxin content was 0.3 ng-TEQ/$m^3$.

The flue gas exhausted from the chimney was sampled and tested, of which the test results showed that: in the flue gas, the dust concentration was less than 10 $mg/m^3$, the CO concentration was less than 500 ppm, the dioxin content was less than 0.2 ng-TEQ/$m^3$, and the $NO_x$ content was less than 25 ppm.

Example 4

A flue gas purification and waste heat utilization method is provided in this example, which used a flue gas purification and waste heat utilization system provided by a specific embodiment to perform deep purification on the flue gas and perform multi-effect utilization on the waste heat of the flue gas. The method specifically included the steps described below.

S1 A wind drawing device 7 drew the flue gas generated from a fourth hole of an EAF 1, in which a flow rate of the flue gas was 400000 $m^3$/h, a temperature of the flue gas was 1350° C., and the flue gas exhausted from the fourth hole of the EAF 1 included one or a combination of at least two of dust, CO, $NO_x$ or dioxin, in which a dust concentration was 18 $g/m^3$, a CO concentration was 15%, a dioxin content was 8 ng-TEQ/$m^3$, and a $NO_x$ content was 1800 ppm; an ammonia-injecting device injected ammonia gas into the flue gas to perform SNCR reaction for removing 65% $NO_x$ in the flue gas, in which a ratio of the injected ammonia gas to $NO_x$ in the flue gas was controlled at 1.55; the unreacted ammonia gas was introduced to a scrap steel preheating device 2 with the flue gas.

S2 In the scrap steel preheating device 2, the flue gas was subjected to heat exchange with the scrap steel, in which the scrap steel was heated to 550° C., so as to realize primary utilization of the waste heat of the flue gas; the cooled flue gas was introduced to a combustion settling chamber 3.

S3 In the combustion settling chamber 3, the flue gas was subjected to combustion at 650° C. for removing CO, in which large particles in the flue gas settled down under gravity; the heated flue gas was introduced to a waste heat boiler 4.

S4 In the waste heat boiler 4, the heat from the flue gas was used to heat the medium of the waste heat boiler 4, in which the flue gas was cooled to 240° C., so as to realize secondary utilization of the waste heat of the flue gas, and the synthesis of dioxin was inhibited by the unreacted ammonia gas injected upstream; the cooled flue gas was introduced in a catalytic reaction device 5.

S5 In the catalytic reaction device 5, $NO_x$ in the flue gas and the unreacted ammonia gas injected upstream were subjected to SCR reaction, in which 88% of the $NO_x$ was removed in the flue gas; dioxin in the flue gas was simultaneously subjected to catalytic decomposition, so as to realize deep purification of the flue gas.

S6 The flue gas escaping from an electrode hole, a furnace door or an observation opening of the EAF 1 was collected by a flue gas cover 9, passed through an escaped flue gas pipeline, mixed with the purified flue gas exhausted from the catalytic reaction device 5, then got rid of the particles by a dust removal device 6, and finally was discharged through a chimney 8, in which a flow rate of the escaped flue gas was 1200000 $m^3$/h, a temperature of the escaped flue gas was 90° C., a dust concentration in the escaped flue gas was 4 $g/m^3$, and a dioxin content was 0.4 ng-TEQ/$m^3$.

The flue gas exhausted from the chimney was sampled and tested, of which the test results showed that: in the flue gas, the dust concentration was less than 10 $mg/m^3$, the CO concentration was less than 500 ppm, the dioxin content was less than 0.2 ng-TEQ/$m^3$, and the $NO_x$ content was less than 25 ppm.

Example 5

A flue gas purification and waste heat utilization method is provided in this example, which used a flue gas purification and waste heat utilization system provided by a specific embodiment to perform deep purification on the flue gas and perform multi-effect utilization on the waste heat of the flue gas. The method specifically included the steps described below.

S1 A wind drawing device 7 drew the flue gas generated from a fourth hole of an EAF 1, in which a flow rate of the flue gas was 500000 $m^3$/h, a temperature of the flue gas was 1400° C., and the flue gas exhausted from the fourth hole of the EAF 1 included one or a combination of at least two of dust, CO, $NO_x$ or dioxin, in which a dust concentration was 20 $g/m^3$, a CO concentration was 20%, a dioxin content was 10 ng-TEQ/$m^3$, and a $NO_x$ content was 2800 ppm; an ammonia-injecting device injected ammonia gas into the flue gas to perform SNCR reaction for removing 70% $NO_x$ in the flue gas, in which a ratio of the injected ammonia gas to $NO_x$ in the flue gas was controlled at 1.6; the unreacted ammonia gas was introduced to a scrap steel preheating device 2 with the flue gas.

S2 In the scrap steel preheating device 2, the flue gas was subjected to heat exchange with the scrap steel, in which the scrap steel was heated to 600° C., so as to realize primary utilization of the waste heat of the flue gas; the cooled flue gas was introduced to a combustion settling chamber 3.

S3 In the combustion settling chamber 3, the flue gas was subjected to combustion at 700° C. for removing CO, in which large particles in the flue gas settled down under gravity; the heated flue gas was introduced to a waste heat boiler 4.

S4 In the waste heat boiler 4, the heat from the flue gas was used to heat the medium of the waste heat boiler 4, in which the flue gas was cooled to 250° C., so as to realize secondary utilization of the waste heat of the flue gas, and the synthesis of dioxin was inhibited by the unreacted ammonia gas injected upstream; the cooled flue gas was introduced in a catalytic reaction device 5.

S5 In the catalytic reaction device 5, $NO_x$ in the flue gas and the unreacted ammonia gas injected upstream were subjected to SCR reaction, in which 90% of the $NO_x$ was removed in the flue gas; dioxin in the flue gas was simultaneously subjected to catalytic decomposition, so as to realize deep purification of the flue gas.

S6 The flue gas escaping from an electrode hole, a furnace door or an observation opening of the EAF 1 was collected by a flue gas cover 9, passed through an escaped flue gas pipeline, mixed with the purified flue gas exhausted from the catalytic reaction device 5, then got rid of the particles by a dust removal device 6, and finally was discharged through a chimney 8, in which a flow rate of the escaped flue gas was 1500000 $m^3$/h, a temperature of the escaped flue gas was 100° C., a dust concentration in the escaped flue gas was 5 g/$m^3$, and a dioxin content was 0.5 ng-TEQ/$m^3$.

The flue gas exhausted from the chimney was sampled and tested, of which the test results showed that: in the flue gas, the dust concentration was less than 10 mg/$m^3$, the CO concentration was less than 500 ppm, the dioxin content was less than 0.2 ng-TEQ/$m^3$, and the $NO_x$ content was less than 25 ppm.

The applicant has stated that the description hereinabove is only specific embodiments of the present application, and the protection scope of the present application is not limited to the description hereinabove. It should be apparent to those skilled in the art that any variations or replacements in the technical scope disclosed by the present application, which are obvious to those skilled in the art of the technical filed, all fall within the protection extent and disclosure scope of the present application.

What is claimed is:

1. A flue gas purification and waste heat utilization system, comprising a flue gas exhaust unit, a primary waste heat utilization unit, a primary flue gas purification unit, a secondary waste heat utilization unit, and a secondary flue gas purification unit sequentially connected in a flue gas flow direction, wherein the primary flue gas purification unit is used for removing $NO_x$, large particles and CO in the flue gas, and the secondary flue gas purification unit is used for removing $NO_x$ and dioxin in the flue gas;
   an ammonia-injecting device is externally connected between the flue gas exhaust unit and the primary waste heat utilization unit, wherein the ammonia-injecting device is used for injecting ammonia gas into the flue gas exhausted from the flue gas exhaust unit.

2. The flue gas purification and waste heat utilization system according to claim 1, wherein the flue gas exhaust unit comprises an EAF;
   optionally, the primary waste heat utilization unit comprises a scrap steel preheating device;
   optionally, the primary flue gas purification unit comprises a combustion settling chamber;
   optionally, the secondary waste heat utilization unit comprises a waste heat boiler;
   optionally, the secondary flue gas purification unit comprises a catalytic reaction device.

3. The flue gas purification and waste heat utilization system according to claim 1, wherein the system further comprises a dust removal device, a wind drawing device and a chimney sequentially connected to the catalytic reaction device;
   optionally, the dust removal device is a bag dust filter.

4. The flue gas purification and waste heat utilization system according to claim 1, wherein the flue gas purification and waste heat utilization system comprises an EAF, a scrap steel preheating device, a combustion settling chamber, a waste heat boiler, a catalytic reaction device, a dust removal device, a wind drawing device and a chimney sequentially connected in a flue gas flow direction;
   optionally, the scrap steel preheating device is connected to a fourth hole of the EAF.

5. The flue gas purification and waste heat utilization system according to claim 1, wherein a flue gas cover is arranged over the EAF, wherein the flue gas cover is used for collecting flue gas escaping from the EAF;
   optionally, the flue gas cover is connected to an escaped flue gas pipeline, and an outlet end of the escaped flue gas pipeline is connected between the catalytic reaction device and the dust removal device, wherein the escaped flue gas from the EAF is collected by the flue gas cover, passes through the escaped flue gas pipeline, mixed with the purified flue gas exhausted from the catalytic reaction device and then enters the dust removal device.

6. A flue gas purification and waste heat utilization method, which uses the flue gas purification and waste heat utilization system according to claim 1 to perform deep purification on the flue gas and perform multi-effect utilization on the waste heat of the flue gas.

7. The flue gas purification and waste heat utilization method according to claim 6, wherein the method comprises:
   injecting ammonia gas into the flue gas drawn from the flue gas exhaust unit by the ammonia-injecting device, performing a reaction for removing $NO_x$ in the flue gas, and then subjecting the flue gas to processes of the primary waste heat unit, the primary flue gas purification unit, the secondary waste heat utilization unit and the secondary flue gas purification unit in sequence, so as to remove CO, $NO_x$, large particles, dioxin and dust in the flue gas and realize multi-effect utilization of the waste heat of the flue gas.

8. The flue gas purification and waste heat utilization method according to claim 6, wherein the method specifically comprises the following steps:
   S1 drawing the flue gas generated from the EAF by the wind drawing device, injecting ammonia gas into the flue gas by the ammonia-injecting device to perform SNCR reaction for removing part of $NO_x$ in the flue gas, and introducing the unreacted ammonia gas to the scrap steel preheating device with the flue gas;
   S2 in the scrap steel preheating device, subjecting the flue gas to heat exchange with the scrap steel, wherein the scrap steel is heated, so as to realize primary utilization of the waste heat of the flue gas, and introducing the cooled flue gas to the combustion settling chamber;
   S3 in the combustion settling chamber, subjecting the flue gas to combustion for removing CO, wherein large particles in the flue gas settle down under gravity, and introducing the heated flue gas to the waste heat boiler;
   S4 in the waste heat boiler, using the heat from the flue gas to heat the medium of the waste heat boiler, so as to realize secondary utilization of the waste heat of the flue gas, wherein the synthesis of dioxin is inhibited by the unreacted ammonia gas injected upstream, and introducing the cooled flue gas to the catalytic reaction device;
   S5 in the catalytic reaction device, subjecting $NO_x$ in the flue gas and the unreacted ammonia gas injected upstream to SCR reaction, and simultaneously subjecting dioxin in the flue gas to catalytic decomposition, so as to realize deep purification of the flue gas; and S6 mixing the purified flue gas and the escaped flue gas which the flue gas cover collects from the boiler, then removing the particles in the mixture by the dust removal device, and finally discharging the flue gas through the chimney.

9. The flue gas purification and waste heat utilization method according to claim 8, wherein, in step S1, the flue gas drawn by the wind drawing device is generated from a fourth hole of the EAF;
   - optionally, a temperature of the flue gas is 1200° C. to 1400° C.;
   - optionally, a flow rate of the flue gas is 200000 m³/h to 500000 m³/h;
   - optionally, the flue gas comprises one or a combination of at least two of dust, CO, $NO_x$ or dioxin;
   - optionally, a dust concentration in the flue gas is 10 g/m³ to 20 g/m³;
   - optionally, a CO concentration in the flue gas is 0% to 20%;
   - optionally, a dioxin content in the flue gas is 0 ng-TEQ/m³ to 10 ng-TEQ/m³;
   - optionally, a $NO_x$ content in the flue gas is 0 ppm to 2800 ppm;
   - optionally, a ratio of the injected ammonia gas to $NO_x$ in the flue gas is controlled within 1.4 to 1.6;
   - optionally, a removal rate of $NO_x$ is 50% to 70% after the SNCR reaction;
   - optionally, in step S2, after the heat exchange between the flue gas and the scrap steel, the scrap steel is heated to a temperature of 400° C. to 600° C.;
   - optionally, in step S3, a combustion temperature of the flue gas is 500° C. to 700° C. in the combustion settling chamber;
   - optionally, in step S4, the flue gas is cooled to a temperature of 200° C. to 250° C. in the waste heat boiler;
   - optionally, in step S5, after the SCR reaction, a removal rate of $NO_x$ is 80% to 90% in the flue gas;
   - optionally, in step S6, the escaped flue gas escapes through an electrode hole, a furnace door or an observation opening of the EAF;
   - optionally, a flow rate of the escaped flue gas is 500000 m³/h to 1500000 m³/h;
   - optionally, a temperature of the escaped flue gas is 60° C. to 100° C.;
   - optionally, a dust concentration in the escaped flue gas is 0 g/m³ to 5 g/m³;
   - optionally, a dioxin content in the escaped flue gas is 0 ng-TEQ/m³ to 0.5 ng-TEQ/m³.

10. The flue gas purification and waste heat utilization method according to claim 8, wherein the method specifically comprises the following steps:
   S1 drawing the flue gas generated from the fourth hole of the EAF by the wind drawing device, wherein the flow rate of the flue gas is 200000 m³/h to 500000 m³/h, the temperature of the flue gas is 1200° C. to 1400° C., and the flue gas exhausted from the fourth hole of the EAF comprises one or a combination of at least two of dust, CO, $NO_x$ or dioxin, wherein the dust concentration is 10 g/m³ to 20 g/m³, the CO concentration is 0% to 20%, the dioxin content is 0 ng-TEQ/m³ to 10 ng-TEQ/m³, and the $NO_x$ content is 0 ppm to 2800 ppm, injecting ammonia gas into the flue gas by the ammonia-injecting device to perform SNCR reaction for removing $NO_x$ of 50% to 70% in the flue gas, wherein the ratio of the injected ammonia gas to $NO_x$ in the flue gas is controlled within 1.4 to 1.6, and introducing the unreacted ammonia gas to the scrap steel preheating device with the flue gas;
   S2 in the scrap steel preheating device, subjecting the flue gas to heat exchange with the scrap steel, wherein the scrap steel is heated to 400° C. to 600° C., so as to realize primary utilization of the waste heat of the flue gas, and introducing the cooled flue gas to the combustion settling chamber;
   S3 in the combustion settling chamber, subjecting the flue gas to combustion at 500° C. to 700° C. for removing CO, wherein large particles in the flue gas settle down under gravity, and introducing the heated flue gas to the waste heat boiler;
   S4 in the waste heat boiler, using the heat from the flue gas to heat the medium of the waste heat boiler, wherein the flue gas is cooled to 200° C. to 250° C., so as to realize secondary utilization of the waste heat of the flue gas, and the synthesis of dioxin is inhibited by the unreacted ammonia gas injected upstream, and introducing the cooled flue gas to the catalytic reaction device;
   S5 in the catalytic reaction device, subjecting $NO_x$ in the flue gas and the unreacted ammonia gas injected upstream to SCR reaction, wherein 80% to 90% of the $NO_x$ is removed in the flue gas, and simultaneously subjecting dioxin in the flue gas to catalytic decomposition, so as to realize deep purification of the flue gas; and
   S6 collecting the flue gas escaping from the electrode hole, the furnace door or the observation opening of the EAF by the flue gas cover, passing the escaped flue gas through an escaped flue gas pipeline, mixing the escaped flue gas and the purified flue gas exhausted from the catalytic reaction device, then removing the particles in the mixture by the dust removal device, and finally discharging the flue gas through the chimney, wherein the flow rate of the escaped flue gas is 500000 m³/h to 1500000 m³/h, the temperature of the escaped flue gas is 60° C. to 100° C., the dust concentration in the escaped flue gas is 0 g/m³ to 5 g/m³, and the dioxin content is 0 ng-TEQ/m³ to 0.5 ng-TEQ/m³.

* * * * *